United States Patent [19]

Li

[11] Patent Number: 4,710,864
[45] Date of Patent: Dec. 1, 1987

[54] SELF-OPTIMIZING METHOD AND MACHINE

[76] Inventor: Chou H. Li, 379 Elm Dr., Roslyn, N.Y. 11576

[21] Appl. No.: 652,494

[22] Filed: Sep. 19, 1984

[51] Int. Cl.$^4$ ............................................. G05B 13/02
[52] U.S. Cl. .................................. 364/148; 364/151; 364/152
[58] Field of Search ................ 364/148, 152, 149, 151

[56] References Cited

U.S. PATENT DOCUMENTS

| | | | |
|---|---|---|---|
| 3,519,998 | 7/1970 | Barron | 364/152 |
| 3,576,976 | 5/1971 | Russo | 364/152 |
| 3,601,811 | 8/1971 | Yoshino | 364/148 |
| 3,694,636 | 9/1972 | Smith, Jr. | 364/152 |
| 3,705,409 | 12/1972 | Brayton et al. | 364/152 |
| 3,794,271 | 2/1974 | Barron et al. | 364/152 |
| 4,368,509 | 1/1983 | Li | 364/148 |
| 4,472,770 | 9/1984 | Li | 364/148 |
| 4,495,559 | 1/1985 | Gelatt, Jr. et al. | 364/148 |
| 4,525,775 | 6/1985 | Eydelman | 364/148 |

Primary Examiner—Jerry Smith
Assistant Examiner—John R. Lastova

[57] ABSTRACT

The invention relates to method for self-optimizing, with closed-loop feed-back control but without human interaction, an object relative to a specific criterion or activity during the operation of said object and in response to variations on a prescribed number m of variables, comprising: planning without human control, guidance, supervision, and intervention a statistical design matrix for testing said m variables in n tests; according to the design matrix performing said n designed tests on said very object in actual operation; determining the instantaneous combination of said m variables which optimizes said specific criterion or activity during said actual operation; setting the conditions of said m variables at the thus-determined optimal combination before the combination significantly changes; and feeding back information on the status of optimization to achieve closed-loop feed-back control. The back-feeding step may be substantially continuous to achieve substantially continuous self-optimizing operation of the object. A machine in the form of programmed microprocessor embodying this close-looped self-optimizing method is also disclosed.

20 Claims, 2 Drawing Figures

SELF-OPTIMIZING METHOD AND MACHINE

This application incorporates, by reference, my U.S. Pat. Nos. 4,368,509 and 4,472,770, as well as my application Ser. No. 069,297.

The '509 patent and '297 application disclose a real-time self-optimizing method and machine. The '770 patent discloses, but fails to claim, a self-optimizing method and machine with substantially continuous or closed-loop feed-back control. This application claims the invention disclosed but unclaimed in the '770 patent.

BACKGROUND

1. Field

The invention relates to substantially continuous self-optimizing method and machine; and more particularly relates to multivariable, real-time self-optimizing method and machine.

2. Prior Art

Present automation systems are extremely useful. With their uses, productivity has greatly been increased. Also, by transferring to machines human intelligence, rather than skill, they have ushered us into this Second Indsutrial Revolution.

No wonder, the industry is rapidly growing; and full of hard-working, reknowned scientists, engineers, and skilled workers diligently laboring day and night. All over the world, new institutions and laboratories are being specially set up to develop new and improved automation technologies, and particularly to provide "artificial intelligence" to these technologies.

But present automation systems are still not smart and must be spoon-fed at every step via computer programs or master-slave instructions. They are also not totally integrated or automated. In addition, they inherit the many defects of the slow, inconsistent, and imperfect human test planners, samplers, testers, data collectors and analyzers, programmers, keypunchers, and machine builders and users. Humans are repeatedly involved but are million times slower and less reliable than microprocessors in, e.g., memory recalling or storing, information inputting or outputting, data analyzing, communicating, and actuating. Most humans can store, recall, compute, or otherwise handle only about three numbers per second and thus have a response time of about 333 ms.

Further, most often these automation systems merely self-organize, self-control, self-adjust, self-adapt, self-regulate, and self-improve; but do not self-optimize, particularly in real time and on many interacting variables.

Yet modern automation systems invariably must deal with fast and complicated processes often involving many unpredictable, interacting, and rapidly changing variables in such categories as: procedures, equipment and facilities, personnel, materials, parts, environment, and/or (international, national, or local) rules or regulations.

My U.S. Pat. Nos. 4,368,509 and 4,472,770 point out that modern technologies generally are complex and fast moving/changing, and require the real-time optimization of many control variables. The one-variable approach is simply inadequate. Even modern control systems that handle one to three variables may not be sufficient. Also, humans are just too slow and unreliable. Hence, multivariate, real-time self-optimizing is often a must. My inventions thus appear to satisfy a long-felt need.

Thus, generally the present automation systems merely passively adapt, adjust, correct, or regulate, in response to variations in only one or a few non-interacting variables or parameters. Dealing with more than a few interacting variables results in extremely large number of tests to be made; and massive amount of data to be collected, conditioned, stored, and instantly analyzed. This is often impractical or impossible, because of the well-known problems of "combinatorial explosion" and "computer intractibility", as will be shown.

Various and voluminous data and information can now be rapidly gathered and interfaced with modern microprocessors, to be handled in real time, but generaly only for transmission, storage, display, or print-out. Usually, the data analyses are untimely completed and not suitable for real-time, multivariable automation procedures.

Artificial intelligence technologies, particularly the expert systems, have thus been developed and increasingly used in various fields. But as shown by the applicant in IEEE Spectrum Forum, Nov. 1983, pp 9–10, the present expert systems are inflexible, costly, qualitative, and often inaccurate or out-of-date. Also, they cannot handle large numbers of interacting variables. More seriously, their response times may be too slow to deal with the many real-world and unpredictable problems of modern automation systems.

Present automation systems also invariably involve many hidden and various errors of sampling and extrapolation of uncertain magnitudes, as shown below.

For example, to optimize a manufacturing system relative to its performances such as productivity, product qualities, production cost and yield, safety, and environmental impact, a control or prediction equation is first developed based on actual or simulation tests on "representative sample manufcturing systems"; and then stepwise programmed onto the microprocessor for execution. The manufacturing system performances depend, of course, on the many variables in the almost always, multi-step manufacturing procedures. The same performances also depend on many other usually neglected but critical variables such as equipment types, ages, operators, and running conditions; materials and parts qualities, vendors, and lots; lubricants types, compositions, and flow rates, directions, or locations; environmental conditions; and the like.

As indicated above, real-time optimization in present automation systems is still limited to handling a few, mostly noninteracting variables. The separate and combined effects of most of the above-listed and many other variables on these systems have never been completely determined or even understood. These effects may also change with time, location, manufacturing system, operators, production runs, . . . In addition, these variables may interact strongly, i.e., have large synergistic or compensating effects. Many of these variables may not even be known or suspected.

With these complexities, the manufacturing system dynamics are typically unpredictable, and often completely or partially unknown or uncertain. It is thus usually impossible to formulate the requisite partial or ordinary differential equations of the system dynamics, or to set up the many associated boundary conditions and equality or inequality constraints, even with many simplifying assumptions and neglecting many or most of the potential variables. The exact or approximate solutions to these intricately coupled equations are even more difficult, if at all possible. For the same reasons, simulations and numerical solutions are often also difficult, incomplete, or impossible.

Classical, closed-loop adaptative control systems based on single response equations each for one or two manufacturing variables may thus not be efficient or even useful.

Still, there remains in each case the real problem of handling a large number of variables in different categories that may or may not be present, important, critical, or interacting. This large number may be 15, 31, 63, 127, or more. All must first be investigated to find out their individual or combined, functional relationships relative to the desired manufacting system performances (such as productivity). Otherwise these performances may not be meaningfully optimized. Merely missing only one or a few of the critical variables may, for example, make the optimization inefficient, irrelevant, misleading, or even dangerous. Yet the very many variables and their surprisingly many interactions, and the vastly more tests normally required have so far made the task of truly optimizing the presently automated, manufacturing (or other) systems hopelessly unmanageable or impossible.

The number of tests n to study completely m variables at only two levels or conditions each is: $n=2$ to the mth power. For $m=15$, $31$, $63$, $127$; $n=32,768$, $2.148 \times 10$ to the 9th., $9.223 \times 10$ to the 18th., and $1.701 \times 10$ to the 38th., respectively.

Taking the last time when $m=127$, to calculate one batch of the test data only once even on a nonosecond computer would require $5.395 \times 10$ to the 21st. years for the conventional method. This would exhaust the resources in time, money, personnel, equipment, and samples for all manufacturers or other institutions. To perform the usual data analysis such as regression, correlation, or variance analysis on these test data requires at least about $3 \times n \times n$ multiplications. Hence, for $m=127$, the usual data analyses would require $2.893 \times 10$ to the 76th. multiplications, or $2.911 \times 10$ to the 43rd. years on the same nanosecond computer.

This is, of course, an example of the problem of "combinatorial explosion." There is no computer with enough memory or computing speed to perform the data analyses even if these large numbers of tests were made. Hence, the simultaneous problem of "computer intractibility."

Even for a small m, e.g., 3 or 4, the usual practice is to make some "representative sample production runs" within relatively narrow experimental ranges. The experimental design and procedure also leaves much to be desired, i.e., always human-guided or controlled and therefore not only very slow but inconsistent and unreliable. Human reaction times, usually a fraction of a second, even with the best researchers and statisticians, are often orders of magnitude slower than process variations in modern operations. Most humans, for example, can handle only three number per second, and even this noncontinuously. Also, usually the investigator is totally relied on to, but generally cannot, decide which "sample" manufacturing systems to select for testing. How many "sample production runs"? How many tests in each sample run? How to test and measure? What variable combinations on each test run? Even which order to test? . . . The hope and assumption is that these sample runs are truly representative and test results meaningful. Unfortunately, such hope and assumption are sometimes unjustified.

No wonder the test data and the resultant prediction equations used for automation programming often fail to give optimal results. Often, the "optimized" controlled conditions may not be optimal at all. This is particularly true when test results on previously constructed, automation systems are applied to future systems made for different operating conditions with slightly different equipment designs, part vendors or material lots and run by other personnel under changed environments, even to the same, exact specifications, i.e., when various extrapolations exist as is almost always the case.

To compound the dilemma, the fact is that no two automation systems or equipment and, indeed, no two components, or two portions of the same component, on the same system or equipment are identically the same, even though every component is perfectly within specifications. This is partly because of the unavoidably but allowably changing tolerances or clearances on the interacting system components. For example, two matching components may behave very differently even if each component has only one critical dimension at the upper limit of the specification, compared to when the two critical dimensions on both components are at the lower limits, or one at the lower while the other at the upper.

As another example, since no two gear teeths are identically the same in dimensions, materials, and properties, a driving gear with 40 teeth matching a driven gear with 100 teeth actually has 4000 different possible combinations if the driving gear can rotate in only one direction, but has 8000 combinations if the same gear can rotate in both directions. The gear axes may also be differently loaded, bent, or oriented depending on the working conditions and other components such as support bearings and associated gears. Different component combinations such as gear-pinion and gear-belt can similarly combine in innumerable ways. Again the problems of "combinatorial explosion" and "computer intractibility."

The chance combinations of which critical component combinations in the "sample" manufacturing systems are totally unknown and unpredictable. To actually measure the innumerable component dimensions and clearances before or after the assembly of the many components, in different directions and along various lengths under varying, actual loading or operating conditions on the automation systems is again impossible or totally impractical.

More seriously, the initial conditions on dimensions, angles, contact stresses and strains, . . . on the "sample" automation systems are now rendered unknown. Hence, one would still be at a loss even if he had perfectly understood and formulated the requisite system dynamics equations and completely solved these equations.

Thus, modern automation systems in general and automated manufacturing systems in particular must be highly flexible, independent and intelligent; and capable of real-time self-optimizing on many variables. These systems must also be very efficient in data handling and information extracting. Also, the only meaningful way to truly optimize the performances of a particular object including manufacturing system should include:

(1) minimizing the chance variations through replicated tests and statistical averaging; and (2) determining the unique functional relationships between the many relevant variables and the performances of this very object or automation system during the particular operation of the object itself.

Yet because of a potentially large numbers of interacting variables, present automation systems cannot even perform a single, complete round of testing. Statistical averaging is thus impossible and chance variations can often be critical.

True and vigorous optimization also requires that the instantaneous optimum combinations of all the relevant variables be quantitatively computed, continuously. In addition, these many variables must be set at these unique optimum combinations at the very instants the functional relationships and optimum variable combinations are determined and before these relationships and combintions change.

These tests, determinations, and variable settings must thus be done dynamically, often very rapidly at very high speeds, to be periodically checked and adjusted every minute, second, or fractional second as is needed. That is, the optimizing cycles or response times must be extremely short and human interactions must be absent.

Hence, efficient, real-time self-optimizing, while absolutely necessary for modern automation systems, is still not available. Human guided, controlled, supervised, or interacted systems are far too slow and unreliable. One also simply cannot rely on chances, hopes, and assumptions.

Accordingly, an object of the present invention is to provide improved self-optimizing machine and method;

A further object of the invention is to provide real-time, self-optimizing machine or method capable of handling tens, hundreds, thousands, or more variables with minimal human guidance;

Another object of this invention is to provide self-optimizing machine or method which can be optimized practically continuously and instantly;

A broad object of the invention is to provide self-optimizing machine or method based on totally self-planned, controlled tests performed on the very particular machine or method itself without relying on extrapolation from samples test results obtained on other similar machines or systems;

Another object of the invention is to optimize machine or method by the installation thereon batteries of modern microelectronics, sensors, actuators, signal-transmission lines, and related devices;

A further object of the invention is to provide self-optimizing machine or method which actively seek, and automatically set at, the instantaneous optimum combinations of the many relevant variables in various categories, with instant feed-back on the status of optimization to supply data for immediate redesigning, retesting, and reoptimizing, all without human intervention.

Further objects and advantages of my invention will appear as the specification proceeds.

SUMMARY

To these ends, the present invention provides a method for real-time self-optimizing, with instant or substantially continuous, closed-loop feed-back control but without human guidance, intervention, and interaction, by automatically, instantly, and preferably continuously and repeatedly: planning efficient, statistical design matrix of n tests, adjusting the conditions of the m variables according to the design matrix with n being less than 2 to the $m-3$)th. power; performing the necessary tests; collecting and recording the n sets of data on the critical performances to be optimized; analyzing the collected data to determine the functional relationship between the m variables and the critical performances; computing for a particular time instant, and combination of the equipment, materials, parts, personnel, procedures, and environment the unique combination of the m variables which optimizes the critical performances; and setting the m variables to the thus-computed unique combination before the functional relationship and unique combination change. A machine operating on the basis of this method is also disclosed.

BRIEF DESCRIPTION

The invention and its further objects and features will be more clearly understood from the following description taken in conjunction with the drawings in which.

BEST MODES

The method and machines of the invention is of general applicability for self-optimizing many and various automation systems and processes, in real time and with lightening speeds in the dealing of tens, hundreds, thousands, or more variables normally requiring millions, billions, or more computational steps.

Figure 1:
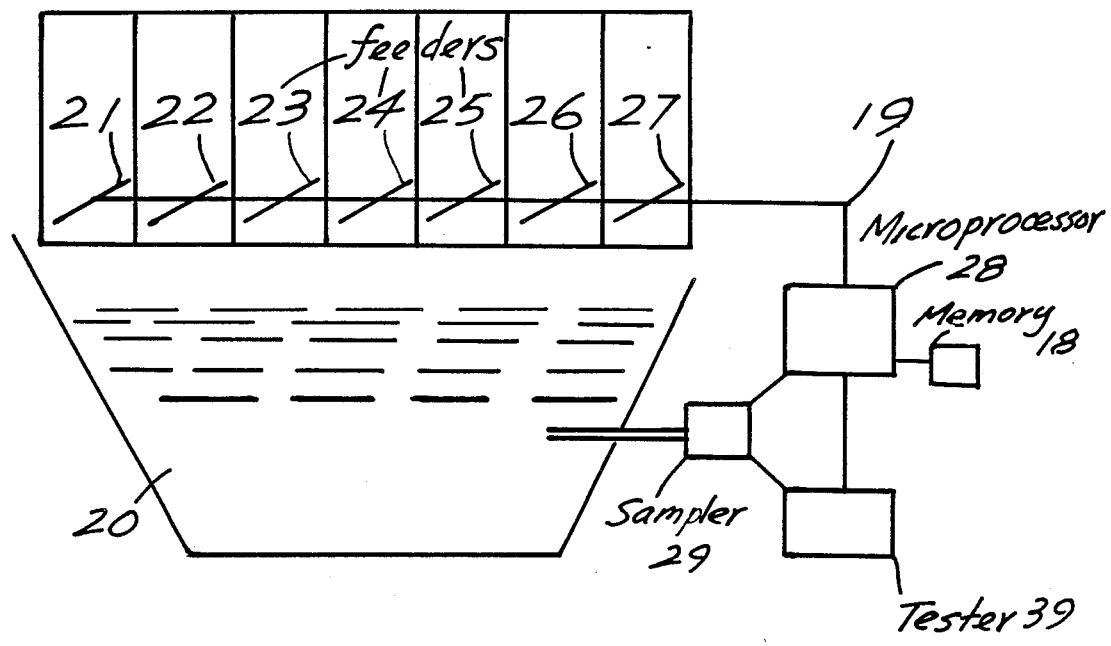
FIG. 1 shows a self-optimizing furnace for special iron-base alloys.

FIG. 3 of the '509 patent, FIG. 1 of my application Ser. No. 069,297, the '770 patent, and this application all show a machine in the form of a furnace to make special iron-base alloys. The furnace is self-optimized relative to a specific performance characteristic, e.g., hot tensile strength of the resultant alloy produced on the furnace in response to variations in a fixed number (e.g., $m=7$) of variables or chemical elements for alloying. This machine or furnace has a built-in microprocessor which first sets up a statistical design matrix of operating or alloy procedures or conditions for the automatic R & D, and then directs, through the transmission line, the seven actuators or alloy elements feeders. The furnace then makes 8 tests or melts of iron-base alloys, which are sampled by a sampler device and tested on a tester. The test results on the performance characteristic (i.e., hot tensile strength) are transmitted to the microprocessor (with attached memory) for data analysis to find the effects of the variaous variables, the steepest-ascent path, and the instantaneous optimum combinaiton of variables. The automatic experimental planning, testing, data analyzing, and feeders adjusting are repeated so that the furnace conditions are always maintained optimal. With minor modification, this self-optimizing steel-making furnace can be made into a self-optimized drug-searching or dispensing machine. Details of the principle, design, and operation of the self-optimizing method and machine are provided in my U.S. application Ser. Nos. 069,297, 275,758 and 428,277, now abandoned and U.S. Pat. Nos. 4,368,509 and 4,472,770, respectively. Computer programming for the optimizing method is also given in patent '509. These detials are incorporated by reference into this application.

FIG. 1 shows a machine 20 in the form of a furnace to make special iron-base alloys. The furnace is real-time self-optimized relative to a specific performance, e.g., hot tensile strength of the resultant alloy produced on the furnace, in response to variations in a fixed number m of variables such as chemical or alloying elements. For ease of illustration, m is only 7 and all these m variables are material variables. This machine or furnace has a built-in microprocessor 28 which first plans a statistical design matrix of 8 tests or alloying compositions, and then directs, through the transmission line 19, the seven actuators or alloying elements feeders 21-27 to feed according to the design matrix. The furnace thus makes the 8 (=n) tests or melts of iron-base alloys, which are sampled by sampler 29 and tested on tester 39. The test resultsa on the critical performance (i.e., hot tensile strength of the resultant alloys) are transmitted to the microprocessor 28 (with attached memory 18) for data analyses to compute the desired functional relationship, i.e., effects of the various variables or alloying elements with or without the steepest ascent path, and the instantaneous optimum combination. The microprocessor 28 then redirects the feeders 21-27 to provide the optimum combination of the alloying elements into the molten iron melt in the furnace 20 for optimized alloy manufacture. Periodically, i.e., every hour, minute, or second, the sampling, testing, data analyzing, and feeders actuating and setting are repeated so that the furnace conditions are always maintained optimal. Other details of the principle, operation, and results of the self-optimizing method and machine are provided in my pending applications, both U.S. and foreign.

Minor modification of the above self-optimizing machine yields a drug-searching or administering machine continuously self-optimized to dispense the instant optimum combinations of drugs such as chemicals, plants, animal tissues, bacteria, genetic or biochemical materials, ... through the feeders 21-27 into a drug-preparing or feeding device. Such a device, in the form of a hypodermic needle, mouth-feeder, or implanted feeder, will dispense the optimum combination of drugs either periodically or in a substantially continuous manner. The tester 29 is then used to test the medical conditions of the human or animal patient as to, for example, vital functions of the organs; chemistry of the blood, urine, and other liquids; or other physiological data (i.e., performances) to be optimized. To search or screen among thousands or millions of drugs for a few that can cure a critical disease such as cancer, my sequential screening technique given in the Jounal of American Statistical Association, Vol. 57, 455-477, 1962, may be used, as has been disclosed in my pending patents and applications. In this way, optimum combinations of drugs can be systematically reserached and found, to be delivered to the patient in real time.

As applied to the furnace invention described above, the flowchart of FIG. 2 shows that the microprocessor 28 of FIG. 1 is first fed with information on the m variables on the different equipment, materials, parts, personnel, environment, procedures, and governmental regulations. The information may include the type, name, and limits or constraints of the variables; and preliminary design data supplied by human experts based on knowledge and previous experience, or by other self-optimizing machines through telecommunication. The microprocessor then continuously and automatically: plans (CAP) the test design matrix of the new alloys, executes (CAE) by processing the designed alloys, samples and tests (CAT) the resultant alloys for hot strength, analyzes the test data to optimize (CAO) according to the given optimizing criteria, i.e., hot tensile strength, and sets the machine for the manufacture of optimized alloys. The status of optimization is continuously checked with feed-back of all existing data to the microprocessor for possible replan, reexecution, retesting, and reoptimization. Meanwhile, the produced opimized alloys are round-the-clock checked (CAC) for 100% quality control.

The results of the data analyses in the CAO and CAC steps may be real-time displayed or printed-out in the form of complex system dynamics or functional relationships between the performances and variables; new and realistic specifications on these performances; best machine operating procedures and modifications; optimum selection of materials or parts, and best personnel procedures or equipment layout.

Such displays or print-outs are not for the raw or semiprocessed data, as has always been the case. Rather, they are the most relevant and up-to-the-second, extremely useful and commercially valuable machine knowledge from the comprehensive, systematic, and exactly but automatically executed R&D. Most of such knowledge may be totally new and not obtainable for months or years by teams of specialists because of the combinatorial exlosin problems previous mentioned.

Such machine intelligence may be transferred to other similar machines or even to humans with great benefits. The transfer of intelligence from machine to machine or to human may signal the beginning of the Third Industrial Revolution.

Note in particular that with the newly invented, self-optimizing method and machine, there are:

(1) no delays due to red tapes, waitings, discussions, conferences, consultations, trips, vacations, phone calls, ... ; and (2) no waste motions for going to meetings, picking up phones, data taking and recording, memo typing, turning on or off switches, looking for specifications, ...

Through totally eliminating human in experimental planning, data analyses, interpretting and concluding, commanding and actuating, the new, self-optimizing method and machine are made totally integrated and automated, from the viewpoint of micromotion and microtime study. There are no wasted microseconds of time or microns of motion on the part of the personnel, euqipment, materials, and parts. This "total automation" principle alone is believed to enhance greatly the efficiency and productivity of the new, self-optimizing machines of the invention.

Also, the self-optimizing method is performed on the very machine of interest and in actual operation, with the exact matrials, parts, procedures, personnel, and environment. Hence, the various ever-present and often critical errors of sampling and extrapolation are minimized or eliminated.

Because of the efficient test design and data analyses, the CAP-CAE-CAT-CAO optimizing cycles may each take only a small fraction of a minute or second, if actuating and data sensing have minimal delays. As a specific example, dealing with the previous case involving 127 (=m) variables at two levels each normally would require making $N=2$ to the 127th. $=1.701\times10$ to the 38th. conventional tests, and over $3\times N\times N=8.685\times10$ to the 76th. multiplications or $2.621\times10$ to the 44th. years on a nanosecond computer for the data analyses. With the technique described here and in the references mentioned above, it now requires making only 128 ($n=2$ to the 7th.) tests, and $7\times128=896$ additions/subtractions and 896 shifts to the right (for a total of 1792 computational steps or 1.79 microseconds on the nanosecond computer). In this example, the self-optimizing cycle computing time of 1.79 us is 1790 times the computer step time of 1 nanosecond.

These and similarly short optimizing cycles make the optimizing process not only simple and possible, but in real time and practically continuous, even for complex, rapidly charging methods or machines. And this is possible even on slow, small-memory microprocessors and without parallel processing.

Since many or most of m variables are usually not significant, they thus provide a measure of the experimental error. Hence, the small number of tests n still allow the equivalent of replicated tests. Statistical averaging is thus possible to minimize the effect of chance variations, which are always present and must be accounted for.

It can readily been seen that the self-optimizing method and machine of the invention can be used for other automation systems in various industries including manufacturing, processing, servicing, office, military, and education. indeed, the self-optimizing machines of the invention are automatic research, development, manufacturing, servicing, and quality control systems.

Figure 2:
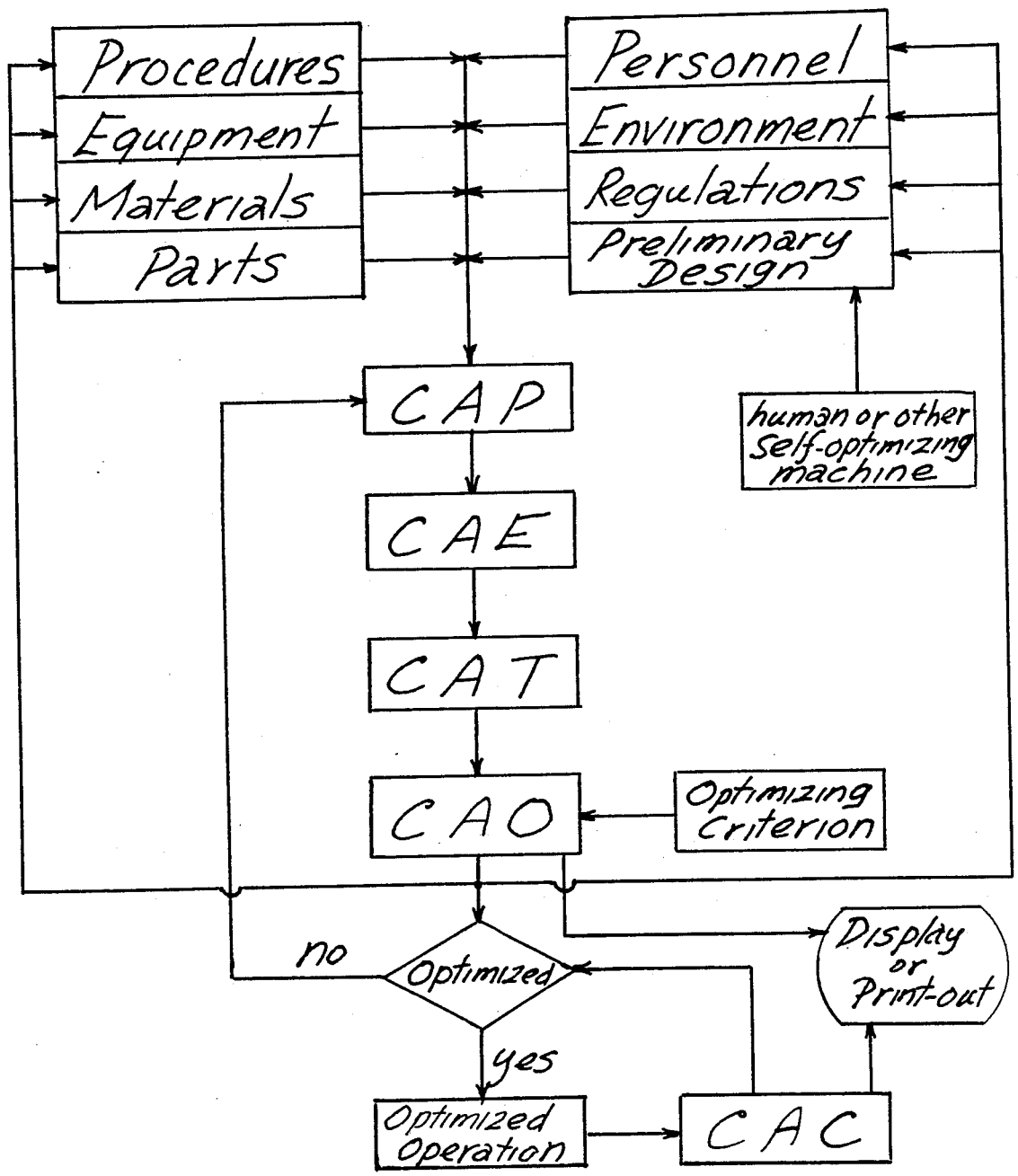
FIG. 2 shows the flowchart of my invented, self-optimizing method.

More specifically, the invention is useful to self-optimize, in real time, the physical or mental growth activities of a living being selected from the group consisting of human, animal, bacteria, and plant. Such activities include: body growth, physical strengthening, sporting, learning various topics such as special skills or responses including: speaking, singing, swimming, reading, memorizing, foreign language, and other academic subjects. The flow chart of FIG. 2 is equally applicable in these cases, even with the same microprocessor and basic computer programs (for CAP, CAE, CAT, and CAO) but with sensors and actuators somewhat different from those used in the self-optimizing furnace of FIG. 1. The specific performance or activity characteristic used as the optimizing criteria will, of course, also vary depending on the activities involved, ranging, e.g., from learning speed, comprehension, growth rate, to others, as is well known to the skilled person.

As an example, to self-optimize in real time the learning process of a human such as a child, one may, according to the description given above and elsewhere, sequentially cause the human to do the specific learning acitivity n times in succession while the conditions of the m selected variables are simultaneously changed according to the design matrix. The m variables may relate to the learning equipment, materials, parts, procedures, and environment, while the optimizing criterion the speed of learning. Similarly, in a self-optimized growth process for objects such as human, animal, bacteria, or plant, the object is caused to grow in n different ways by suitably actuating the m growth variables according to the design matrix. The specific performance to be optimized here may be growth rate, cost per given growth, and environmental impact.

According to the method of the invention, I have developed a real-time self-optimizing heating system or machine. This machine has a 64-K, Apple II Plus microcomputer, a Lindberg furnace, a chromel-alumel thermocouple sensor, and a 25-Ampere Omega solid-state relay as the actuator. A 3¾-bit A to D converter, a special parallel interface board, and some transmission lines complete the hardware. The machine does not work on a fixed, control program. Rather, its Apple microcomputer plans its own test design matrix; directs the relay actuator to be on and off to perform the designed tests according to the design matrix; collects and analyzes the sensed temperature data to determine, with or without the use of the steepest ascent method, the instantaneous, unique combination of variables which optimizes the machine performance, i.e., the sum of minimum temperature fluctuations and absolute temperature deviation from the set temperature; and sets the furnace accordingly. Within minutes of turning on, the furnace is heated to and controlled within typically ¼ degree Centigrade from the set temperature. This deviation is the limit of the A to D converter. Some other real-time self-optimizing machines are also being tested.

My '509 and '770 patents disclose in sufficient details the principles, techniques, stepwise procedures, variable selections, hardwares and softwares, and examples of application of the self-optimizing method and machine. The techniques disclosed include automatic statistical designs, sequential screening of variables, and substantially continuous self-optimizing methods and machines, and self-optimizing methods and machines with closed-loop feed-back control. Examples of applications include special steel manufacture, drug dispensing, and car control. These details are incorporated by reference into this application.

In addition, the '509 patent also points out the various relevant prior arts including Hardaway's extreme parameter search control system (U.S. Pat. No. 3,466,430, Russo's combined pattern recognition and linear regression network (U.S. Pat. No. 3,576,976), Smith's digital process control (U.S. Pat. No. 3,694,636), and Barron control systems (U.S. Pat. Nos. 3,460,096 and 3,519,998) which provide background for the design and use of control systems, system programming, actuators, calculators, timing circuits, A/D or D/A converters, storage memories, sensors, comparators, logic devices, sign detectors, . . . which are often useful in the practice of my inventions.

The key hardwares for my new control systmes are, as usual, microprocessors, sensors, and actuators. Microprocessors have been greatly improved since these prior-art patents were issued. These modern microprocessors can handle very large number of variables in real time with my inventions for self-optimizing relative to such performances as hot tensile strengths in steel manufacture or fuel economy or time of trip in new car control. The control variables may be, for example, melt composition or alloy element additions in steel making or pressures, temperatures, timeings, forces, fluid levels, flow rates, voltages, currents, forces, . . . in new cars. Sensors are now commercially available to sense the levels or conditions of the control variables. For example, the alloy compositions may be sensed by mass spectrograph, Auger analyzers, microprobes, . . . . Actuators are also available to actuate, for example, alloy element feeders in steel manufacture; or timers, metering devices, voltage regulators, force applicators, . . . in the new car controls. These key hardwares may be suitably interconnected as per conventional control technologies, but to be operated as new systems according to my self-optimizing control techniques and softwares for accomplishing previously impossible results in many important applications. I hereby incorporate those essential materials into this application by reference.

The invention is not to be construed as limited to the particular forms disclosed herein, since these are to be regarded as illustrative rather than restrictive.

I claim:

1. A machine for real-time self-optimizing, without human interaction, an object relative to a specific criterion or activity in response to variations on a prescribed number m of variabes, comprising:
   means for automatically planning a statistical design matrix for testing the m variables in n tests;
   means for performing said n designed tests according to the design matrix on said object;
   means for determining the instantaneous combination of said m variables which optimizes said specific criterion or activity;
   means for setting the conditions of said m variables at the thus-determined optimal combination: and
   means for coupling the planning, performing, determining, and setting means for substantially continuous recycling to achieve real-time self-optimizing control.

2. A machine as in claim 1 wherein the object is a living being selected from the group consisting of human, animal, bacteria, and plant, and the prescribed activity of the object relates to growth of the object, and the specific activity characteristic is the rate of growth.

3. A machine as in claim 1 wherein the prescribed activity of the object relates to mental growth of the object, and the m variables are growth-affecting variables.

4. A machine as in claim 1 wherein the object is a human, the prescribed activity of the object is learning, and the specific activity characteristic is the rate of learning at a given comprehension level, and the m variables are selected from the group consisting of equipment, materials, parts, procedures, and environment.

5. A machine as in claim 1 wherein the prescribed activity of the object relates to physical growth of the object, and said m variables are growth-affecting variables selected from the group consisting of equipment, materials, parts, procedures, and environment.

6. The machine as in claim 1 wherein said determining means determines the instantaneous optimal combination within no more than 1.79 microseconds.

7. The machine as in claim 1 wherein said determining means quantitatively computes the instantaneous optimal combination.

8. The machine as in claim 1 for real-time self-optimizing substantially continuously said object.

9. The machine as in claim 1 wherein said performing means includes means for performing the equivalent of multivariable replicated tests to achieve statistical averaging and to minimize the effect of chance variations.

10. The machine as in claim 1 including means for real-time feed-back to supply data for said planning means to replan, performing means to reperform, determining means to redetermine, and setting means to reset, instantly and still without human intervention.

11. The machine as in claim 1 wherein said determining means also generates as machine intelligence the instantaneous optimum combination and also including means for transferring such machine intelligence to the human.

12. The machine of claim 1 wherein said planning, performing, determining, setting, and back-feeding means successively and cyclically operate according to the sequence given, and said coupling means substantially continuously feeds back information for substantially continuous, closed-looped self-optimizing operation of the machine.

13. The machine of claim 1 wherein said determining means comprises a computing means having a specified computing step time and the computing time for each self-optimizing cycle is no more than 1790 times the computing step time.

14. A method for self-optimizing, without human interaction, an object relative to a specific criterion or activity during the operation of said object and in response to variations on a prescribed number m of variables, comprising:
   planning without human control, guidance, supervision, and intervention a statistical design matrix for testing said m variables in n tests;
   according to the design matrix performing said n designed tests on said very object in actual operation;
   determining the instantaneous combination of said m variables which optimizes said specific criterion or activity during said actual operation;
   setting the conditions of said m variables at the thus-determined optimal combination; and
   substantially continuously repeating the planning, performing, determining, and setting steps to achieve real-time self-optimizing control.

15. The product of claim 14 with the exception of human beings.

16. The method as in claim 14 wherein said determining step determines said instantaneous optimal combination within less than 1.79 microseconds.

17. The method as in claim 14 wherein said determining step also computes the functional relationships between said m variables and the specific criterion or activity, and also including transferring such machine intelligence to the human.

18. The method of claim 14 wherein said planning, performing, determining, setting, and repeating steps are performed successively and cyclically according to sequence given, and the repeating step substantially continuously feeds back the information to thereby achieve a substantially continuous, self-optimizing operation.

19. A method for substantially continuously real-time self-optimizing, without human interaction, a machine relative to a specific performance during the operation of said machine and in response to variations on a prescribed number m of variables, comprising:
   programming the machine to cause it to plan by itself a statistical design matrix for testing said m variables in n tests;
   according to said design matrix performing said n designed tests on the very machine actually in said operation;
   determining the instantaneous combination of said m variables which optimizes the specific performance during said operation;
   setting the conditions of said m variables at the thus-determined optimal combination before the combination significantly changes; and
   substantially continuously repeating said programming, performing, determining, and setting steps in the above sequence to achieve real-time self-optimizing control.

20. A machine as in claim 19 including a second, physically independent object; a second machine of the same type as said machine; the second object having similar but not exactly identical activity characteristic under operating conditions of the second machine similar to those on said machine; and including also means for telecommunicating from said machine to the second machine as to the unique optimizing combination, for starting up the self-optimizing procedure of the second machine thereby shortening the time for achieving optimized performance on the second machine.

* * * * *